United States Patent
Hannum et al.

(10) Patent No.: US 7,349,982 B2
(45) Date of Patent: Mar. 25, 2008

(54) ENABLEMENT OF ROUTE TABLE ENTRIES

(75) Inventors: David Paul Hannum, Ft. Collins, CO (US); Aron Charles Miller, Ft. Collins, CO (US); Guy Lowell Kuntz, Chico, CA (US); Ryan Lee Weaver, Sacramento, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 958 days.

(21) Appl. No.: 10/756,433

(22) Filed: Jan. 12, 2004

(65) Prior Publication Data

US 2005/0152332 A1 Jul. 14, 2005

(51) Int. Cl.
G06F 15/173 (2006.01)

(52) U.S. Cl. .................. 709/238; 709/242; 370/351; 370/395.31

(58) Field of Classification Search ........ 709/223–224, 709/238–242; 370/351–356, 395.31, 395.32, 370/400
See application file for complete search history.

(56) References Cited

U.S. PATENT DOCUMENTS

| 5,696,763 | A | 12/1997 | Gang, Jr. |
| 6,704,283 | B1 * | 3/2004 | Stiller et al. ................ 709/242 |
| 6,934,763 | B2 * | 8/2005 | Kubota et al. .............. 709/242 |
| 6,965,599 | B1 * | 11/2005 | Sakurai et al. ............. 709/239 |
| 7,058,724 | B1 * | 6/2006 | Das et al. ................... 709/238 |
| 7,178,015 | B2 * | 2/2007 | Shaw et al. ..................... 713/1 |
| 7,272,648 | B2 * | 9/2007 | Kawasaki et al. ......... 709/224 |
| 2002/0143787 | A1 * | 10/2002 | Knee et al. ................. 707/102 |
| 2003/0065816 | A1 * | 4/2003 | Dharmadhikari et al. ... 709/240 |
| 2003/0225907 | A1 * | 12/2003 | Krishnan .................... 709/238 |
| 2003/0231628 | A1 |   12/2003 | Harada et al. |
| 2004/0218549 | A1 * | 11/2004 | Chen .......................... 370/254 |

* cited by examiner

Primary Examiner—Bharat Barot (57) ABSTRACT

A router routes packets among a plurality of nodes based on entries in a route table. Entries in a route table enable mask characterize the enablement of the route table entries. The router receives a packet including an indication to modify the route table enable mask from one of the nodes. The router produces an update mask and determines which logical operation to perform on the update mask and the route table enable mask in response to at least one of the received packet, the update mask, and the route table enable mask. The router generates a new route table enable mask by performing the appropriate logical operation on the update mask and the route table enable mask in response to the determination of which logical operation should be performed and the route table enable mask is replaced with the new route table enable mask.

25 Claims, 5 Drawing Sheets

ENABLEMENT OF ROUTE TABLE ENTRIES

FIELD

The invention pertains to the field of routing and, more particularly, to the enablement of route tables entries.

BACKGROUND

A network may be formed by connecting a plurality of nodes to a routing fabric that includes a plurality of routers. A source node may transmit a packet to a destination node via the routing fabric. The routers within the routing fabric route the packet from the source node toward the destination node based on information stored in a route table.

The route table includes a list of entries that identify where to direct a packet based on the packet's destination address. When the packet from the source node is received by one of the routers, it decodes the packet to identify its destination address. The router then looks up the entry in a route table corresponding to the identified destination address. That route table entry indicates an output port to which the received packet is directed.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some general concepts of the invention in a simplified form as a prelude to the more detailed description that is presented later.

In one embodiment, the invention encompasses a method for modifying the routing of packets in a system where packets are routed among a plurality of nodes in accordance with a route table and a route table enable mask. The route table enable mask has entries that characterize the enablement of corresponding entries in the route table. A packet including an operation code and an update mask is received from one of the nodes. The route table enable mask is read from a memory location. A new route table mask is generated by performing a logical operation on the update mask and the route table enable mask in response to the operation code and then is stored in the memory location.

In another embodiment, the invention encompasses a method for updating a route table enable mask. A packet including an indication to modify the route table enable mask is received from one of the nodes in a network. An update mask is produced and a new route table enable mask is generated by performing the appropriate logical operation on the update mask and the route table enable mask.

In yet another embodiment, the invention encompasses a router of a routing fabric for routing packets among a plurality of nodes. The router comprises an input port, a plurality of output ports, a memory for storing a route table and a route table enable mask, and a processor. The processor produces an update mask and generates a new route table enable mask by performing an appropriate logical operation on the update mask and the route table enable mask in response to the determination of which logical operation to perform.

In yet another embodiment, the invention encompasses a symmetric multiprocessor system comprising a plurality of cells having at least one processor and a routing fabric. The routing fabric has a crossbar for communicating a packet from one cell to another cell. The crossbar has a plurality of input ports coupled to one of the plurality of cells for receiving a packet comprising an update mask from the cell, a plurality of output ports coupled to one of the plurality of cells, a storage device for storing a route table having a plurality of route table entries and a route table enable mask having a plurality of route table enable mask entries corresponding to route table entries, and a processor for generating a new route table enable mask by performing a logical operation on the update mask and the route table enable mask.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION

Figure 1:
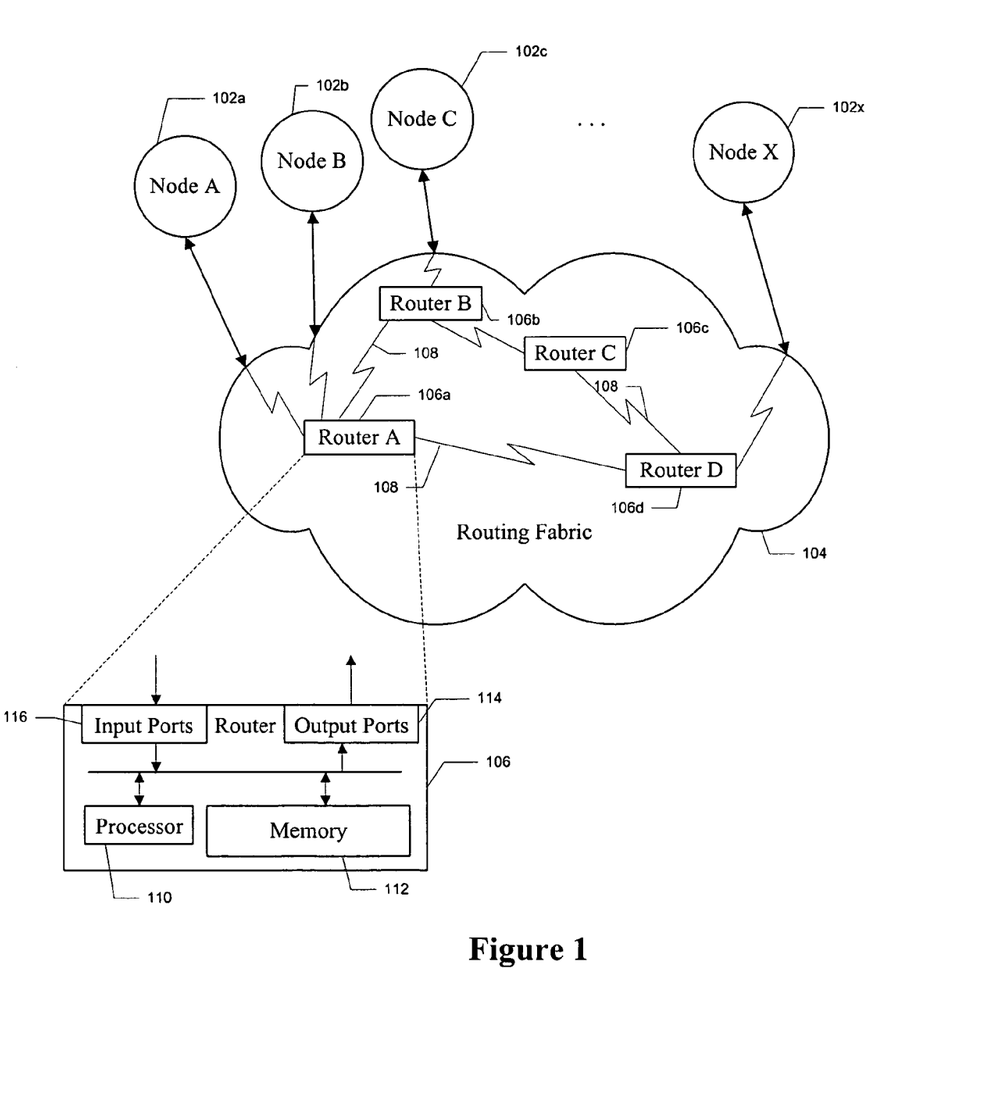
FIG. 1 is a block diagram of a network according to an embodiment of the invention.

Referring to the drawings, in which like reference numerals indicate like elements, there is shown in FIG. 1 a network 100 according to an embodiment of the invention. The network 100 includes a plurality of nodes 102 connected to a routing fabric 104 that includes a plurality of routers 106.

Each router 106 includes at least one input port 116, at least one output port 114, a processor 110 and memory 112. When a packet from one node 102 (the source node) is received on one of a router's 106 input ports 116, the router 106 routes the packet toward another node 102 (the destination node) based on information stored in a route table and a route table enable mask.

If the destination node is connected to the router that received the packet, the router may route the packet directly to the destination node. For example, if node A 102a (source node) transmits a packet to router A 106a that has a destination address identifying node B 102b (destination node), the router A 106a will route the received packet directly to node B 102b via one of its output ports. If the destination node instead is node X 102x and is not directly connected to the router A 106a that received the packet, the router A 106a may route the packet to router D 106d on another output port or to router B 106b on yet another output port on a path toward the destination node X 102x.

A router 106 determines which output port to use for transmitting a packet toward a destination node based on entries in a route table and a corresponding route table enable mask. The process by which a router 106 determines which output port to use is described with reference to the data flow diagram 200 in FIG. 2.

Figure 2:
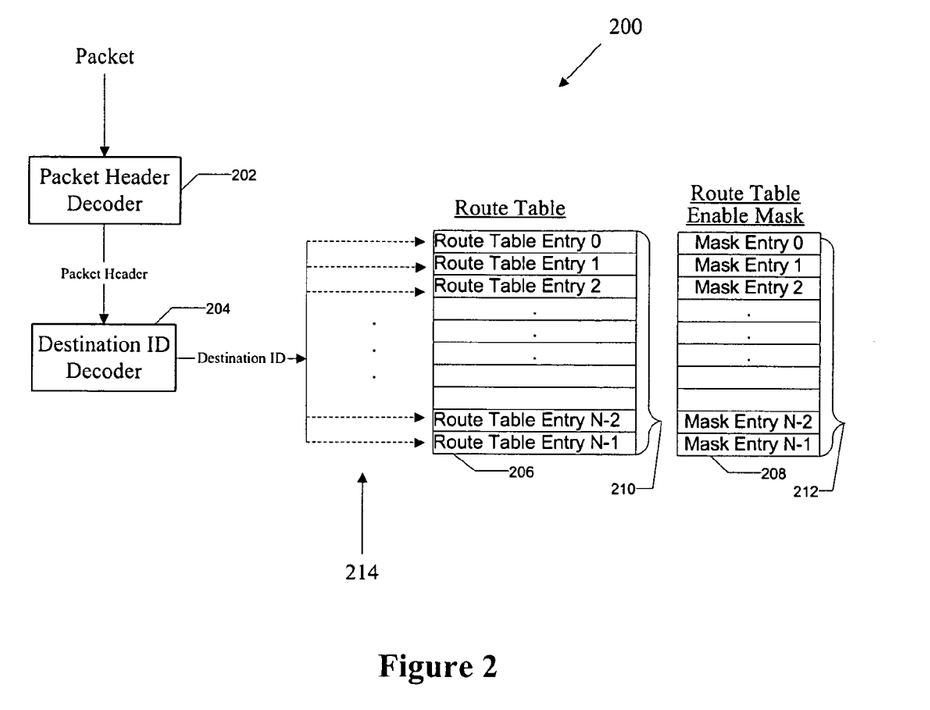
FIG. 2 is a data flow diagram illustrating a method of routing according to an embodiment of the invention.

The router includes a route table 206 and a route table enable mask 208. The entries 212 in the route table enable mask 208 characterize the enablement of corresponding entries 210 in the route table 206. In this exemplary embodiment, the route table enable mask entries 212 enable or disable routing according to their corresponding route table entries 210. A router may include one or more route tables and route table enable masks. In an embodiment, a router includes a route table for each of its input ports. In an embodiment, a router includes a route table enable mask that characterizes the enablement of entries in a plurality of route tables. In an embodiment, a route table enable mask entry 212 characterizes the enablement of and corresponds to a plurality of route table entries 210.

When a router 106 receives a packet, it decodes the header from the packet using a packet header decoder 202. The header of the packet includes a destination ID that identifies the desired destination of the packet. A destination ID decoder 204 decodes the packet header to identify the destination ID (i.e., identifier or address) of the packet.

Once the destination ID of the packet is identified, the router 106 maps the destination ID to one of the entries 210 in the route table 206 to determine where to and whether to route the received packet. The mapping of a destination ID to a route table entry 210 is illustrated by the arrows 214 in FIG. 2.

Each route table entry 210 identifies an output port to which a packet should be routed. Each route table enable mask entry 212 characterizes the enablement of at least one route table entry 210.

If the mask entry 212 corresponding to the mapped route table entry 210 is a "1," the route table entry 210 is enabled and the packet is routed to the output port identified by the route table entry 210. If the mask entry corresponding to the mapped route table entry is a "0," the route table entry 210 is disabled and the packet is discarded or dropped.

The route table enable mask may be changed during operation of the network to affect the routing of packets through the network. For example, if a node 102 in the network 100 is to be taken offline, it may send an update packet to all routers instructing them to update their route table enable masks 208 to disable routing to the offline node. A node 102 may similarly send an update packet when it comes online to enable routing to that node.

Figure 3:
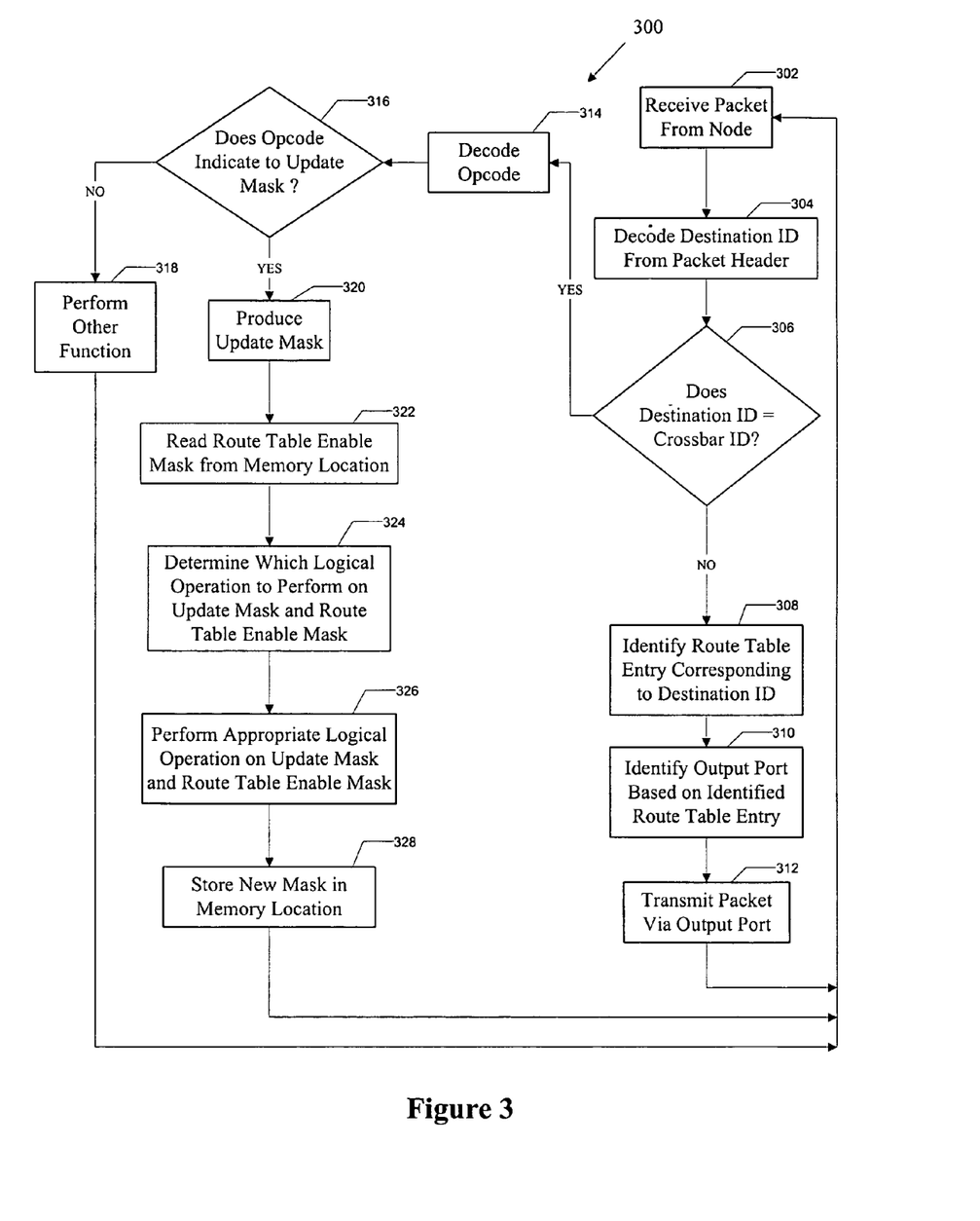
FIG. 3 is a flow chart illustrating a method for processing a received packet according to an embodiment of the invention.

A method of modifying a route table enable mask is described with reference to the flow chart 300 of a method for processing a received packet shown in FIG. 3. Embodiments of the invention encompass methods where multiple steps of the method illustrated in FIG. 3 are combined or are implemented out of the illustrated order. In an embodiment, the method of FIG. 3 is implemented by the processor 110 executing a corresponding program stored in the memory 112. In an embodiment, the method of FIG. 3 is implemented in by the router in hardware, software, firmware, or a combination thereof.

A packet from one of the nodes 102 in the network 100 is received by a router 106 in step 302. The destination address or ID of the packet is decoded from the packet header in step 304. The destination address identifies a unique node or router address and is used to determine whether the packet is destined for the router that received it or for another node or router. If the destination address is identified in step 306 as designating another node or router in step 306, the packet is further processed by the router and routed toward the destination node as described above with regard to FIGS. 1 and 2. In particular, in step 308, the destination address is mapped to one of the route table entries. The output port is identified based on the route table entry in step 310 and the packet is transmitted via the identified output port in step 312 if the route table entry is enabled by a corresponding route table enable mask entry.

If the destination address of the received packet is identified in step 306 as designating the router that received the packet, an operation code (opcode) is decoded from the packet in step 314. The opcode indicates a function to be performed by the router in response to the received packet. The indicated function may be to update the route table enable mask or to perform another function. If the router determines in step 316 that the function is not to update the route table enable mask, then that other function is performed in step 318.

If the function indicated by the opcode is determined in step 316 to be to modify the route table enable mask, an update mask is produced in step 320 and the route table enable mask is read from a location in memory 112 in step 322. A determination is made in step 324 of which logical operation to perform on the update mask and the route table enable mask. A new route table enable mask is generated in step 326 by performing the appropriate logical operation on the (old) route table enable mask and the update mask and the new mask is stored in the memory location in step 328.

In an embodiment, only one packet for modifying a route table enable mask is processed at a time and packets to modify the mask received from other routers are buffered until the update of the mask is complete for the currently processed packet. In an embodiment, steps 322, 324, 326, and 328 may only be performed for one received packet at a time.

Figure 4A:
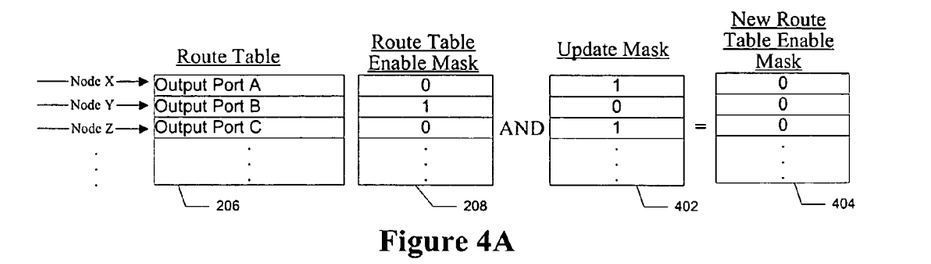
FIGS. 4A, 4B, 4C and 4D illustrate methods of generating new route table enable masks.
Figure 4B:
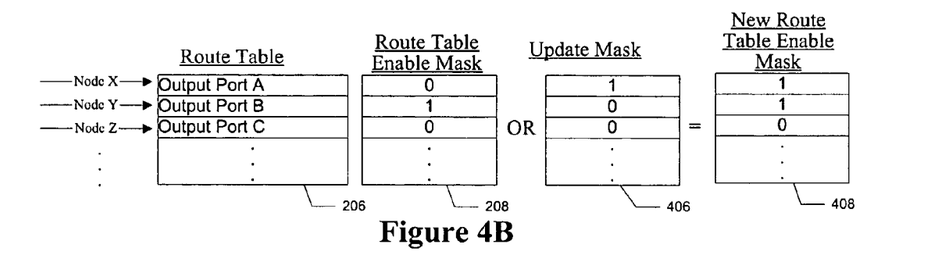

Exemplary methods of generating new route table enable masks are described with reference to FIGS. 4A and 4B. A router includes a route table in FIG. 4A where a destination address identifying nodes X, Y, and Z are mapped to route table entries identifying output ports A, B, and C, respectively. A value of "1" in a route table enable mask entry enables a corresponding route table entry and a value of "0" disables a corresponding route table entry.

A method of disabling routing is described with reference to FIG. 4A. The bit in the update mask 402 corresponding to output port B is a "0" and all other bits are "1"s. A logical AND operation is performed on the update mask 402 and the route table enable mask 208 to generate the new route table enable mask 404 where the only modified entry corresponds to output port B. The AND operation disables routing to output port B by changing its corresponding mask entry to a "0" (or keeping it at "0" if previously set to "0") and all other mask entries remain the same.

A method of enabling routing is described with reference to FIG. 4B. The bit in the update mask 406 corresponding to output port A is a "1" and all other bits are "0"s. A logical OR operation is performed on the update mask 406 and the route table enable mask 208 to generate the new route table enable mask 408 where the only modified entry corresponds to output port A. The OR operation enables routing to output port A by changing its corresponding mask entry to a "1" (or keeping it at "1" if previously set to "1") and all other mask entries remain the same.

In an embodiment of the invention, the route table enable mask is updated in response to a packet received from a cell without the cell knowing the values of the current route table enable mask. The logical operation may be configured to set (1) or reset (0) a particular route table enable mask entry without regard to the status of the other entries in the mask, without the cell reading the mask in advance of generating the packet, and without synchronization of other cells that may choose to update the same mask.

Although described above with regard to FIGS. 4A and 4B as modifying a single entry in a route table enable mask 208, embodiments of the invention encompass modifying a plurality of entries for enabling or disabling a plurality of route table entries. For example, the update mask 402 in FIG. 4A may include a plurality of "0" bits to disable a plurality of entries in the route table 206.

Figure 4C:
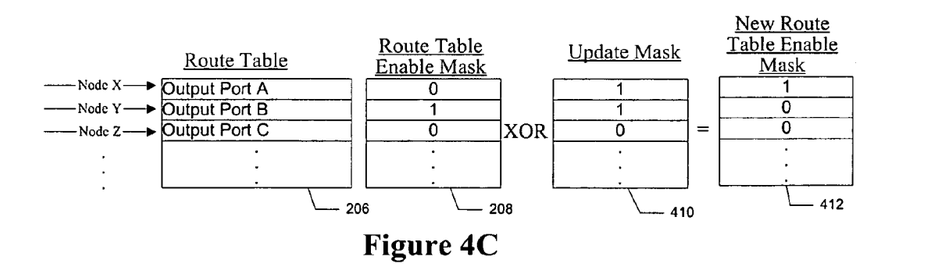

Embodiments of the invention also encompass enabling and disabling one or more entries of a route table in a single operation. For example, a logical exclusive-OR operation of the route table enable mask and an update mask may enable one or more entries and disable one or more entries in the route table. A method of enabling and disabling routing is described with reference to FIG. 4C. A logical exclusive-OR (XOR) operation is performed on the update mask 410 and the route table enable mask 208 to generate the new route table enable mask 408 where the route table enable mask entry corresponding to output port A is enabled and the route table enable mask entry corresponding to output port B is disabled in a single operation.

Figure 4D:
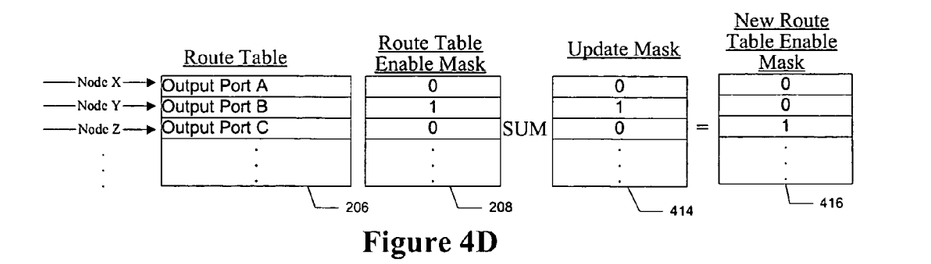

The term "logical operation" as used herein encompasses arithmetic operations such as summation, division, multiplication and division. The update mask may be produced such that the arithmetic operation results in the desired new route table enable mask. With reference to the embodiment of FIG. 4D, if the logical operation is a summation (SUM) operation, the update mask 414 and the route table enable mask 208 are the operands of the summation and the new route table enable mask 416 is the sum of the operands. In this example, with the entries corresponding to output port A being the least significant bit in the summation, the sum of the route table enable mask 208 and update mask 414 generates a new route table enable mask 416 having an entry corresponding to output port B changed from enabled to disabled and an entry corresponding to output port C changed from disabled to enabled.

The destination ID may identify both a router and one of its route table enable masks and function as both the destination ID and the opcode. In other words, in an embodiment where a destination ID identifies a particular mask, the processor 110 interprets the corresponding packet as a request to modify that mask. When the destination ID identifies both a router and one of its route table enable masks, steps 306, 314, and 316 may be combined into a single step of identifying which mask is selected to be modified.

In an embodiment, a packet received on an input port can indicate to modify a route table enable mask corresponding to any input port on a particular router. In an embodiment, the processor 110 validates a packet that includes an indication to modify a route table enable mask. The processor 110 validates packets by restricting packets received on an input port so they are only permitted to modify a route table enable mask corresponding to that input port. In an embodiment, the processor 110 restricts modification of a route table enable mask entry to nodes having a source address that corresponds to the corresponding route table entry to be enabled or disabled.

In an embodiment, a packet received by the router 106 includes the update mask and step 320 of producing the update mask comprises decoding the update mask from the received packet. In another embodiment, the step 320 of producing the update mask comprises generating the update packet based on the source address and the route table enable mask. For example, in a system where a node may only enable or disable its own corresponding route table entries, the source address identifies the route table entry and mask entry to be modified. The update mask is then generated by the processor 110 in response to the current route table enable mask entry for that node by generating an update mask that will toggle its value between enable and disable values.

In an embodiment, the router determines which logical operation to perform based on the received packet. The packet may include an opcode, for example, indicating which logical operation to perform. For example, an opcode may include one bit to indicate which of an AND and an OR operation to perform. In another embodiment, the router may determine which logical operation to perform based on the update mask. For example, in the case described above with reference to FIGS. 4A and 4B, the processor may determine to perform a logical AND operation in response to update mask having only one "0" value and may determine to perform a logical OR operation in response to update mask having only one "1" value. In yet another embodiment, the router determines which logical operation to perform based on the current value of a route table enable mask entry to be modified by selecting a logical operation to change its current value to an opposite value.

Figure 5:
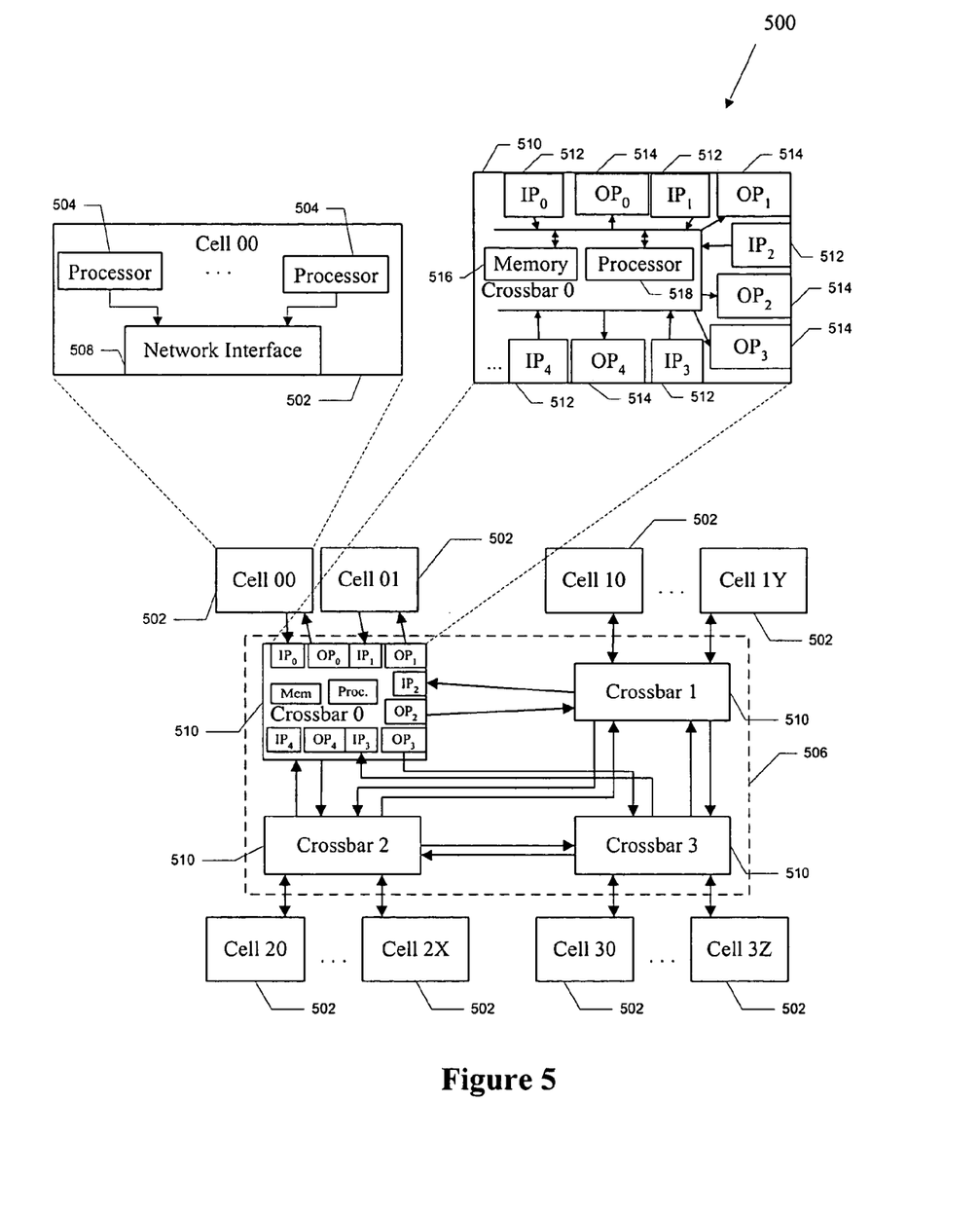
FIG. 5 is a block diagram of a symmetric multiprocessor system according to an embodiment of the invention.

The method of updating the route table enable mask may be applied to a symmetric multiprocessor system (SMP) 500 as shown in FIG. 5. The SMP 500 includes a plurality of cells 502 having at least one processor 504. The cells 502 are coupled to a routing fabric 506 via a network interface 508. The routing fabric 506 includes a plurality of crossbars 510 as its routers for communicating packets from one of the plurality of cells 502 to another of the plurality of cells 502.

The crossbars 510 include a plurality of input ports (IP) 512, a plurality of output ports (OP) 514, a storage device 516 and a processor 518. The input ports IP are coupled to cells 502 or to other crossbars 510 for receiving packets from the cells 502 or crossbars 510. The output ports OP 514 are coupled to cells 502 or to other crossbars 510 for transmitting packets to the cells 502 or crossbars 510.

One or more route tables and corresponding route table enable masks are stored in the memory 516 of each crossbar 510. The processor 518 uses the route tables and the route table enable masks in accordance with the description above for routing packets from among the cells 502 and crossbars 510 and for updating the route table enable masks. In an embodiment, a crossbar includes a route table for each of its input ports and a route table enable mask for each of its route tables. In an embodiment, a route table includes an entry for each cell and at least one destination address is mapped to a route table entry.

The invention is described above with a route table enable mask entry of "1" enabling a corresponding route table entry and a value of "0" disabling a corresponding route table entry. The invention also encompasses embodiments where a route table enable mask entry value of "0" enables and a value of "1" disables one or more corresponding route table entries. The invention encompasses embodiments where a route table enable mask entry characterizes the enablement of routing according to route table entries and is not limited to the use of single bit values to characterize enablement.

Although the invention is described above as using logical AND and OR operations, the scope of the invention encompasses other logical operations. For example, an appropriate update mask may be generated to perform an exclusive-OR operation for generating a new route table enable mask. The invention is not limited to a particular embodiment of a node or a network. A node generates a packet received by a router for updating its route table enable mask. Embodiments of the invention encompass a node being a computer, a process, and a router. Embodiments of the invention encompass the network being the Internet and a multiprocessor system.

The foregoing describes the invention in terms of embodiments foreseen by the inventors for which an enabling description was available, although insubstantial modifications of the invention, not presently foreseen may nonetheless represent equivalents thereto.

What is claimed is:

1. A method for modifying the routing of packets in a system where packets are routed among a plurality of nodes in accordance with a route table having a plurality of route table entries and a route table enable mask having a plurality of route table enable mask entries that characterize the enablement of corresponding route table entries, the method comprising:
   a. receiving a packet from one of the nodes, the packet including an operation code and an update mask;
   b. reading the route table enable mask from a memory location;
   c. generating a new route table enable mask by performing a logical operation on the update mask and the route table enable mask in response to the operation code; and
   d. storing the new route table enable mask in the memory location.

2. The method according to claim 1 wherein the update mask comprises a plurality of bits and one of the plurality of bits is set to a value to enable corresponding route table entries and the other of the plurality of bits are set to a value to disable corresponding route table entries.

3. The method according to claim 2 wherein the value to enable is a 1, the value to disable is a 0, and the operation code includes an indication to perform an OR operation to generate the new route table enable mask.

4. The method according to claim 1 wherein the update mask comprises a plurality of bits and one of the plurality of bits is set to a value to disable corresponding route table entries and the other of the plurality of bits are set to a value to enable corresponding route table entries.

5. The method according to claim 4 wherein the value to enable is a 1, the value to disable is a 0, and the operation code includes an indication to perform an AND operation to generate the new route table enable mask.

6. A method for updating a route table enable mask in a system where packets are routed among a plurality of nodes in accordance with a route table having a plurality of route table entries where the route table enable mask has a plurality of route table enable mask entries that characterize the enablement of corresponding route table entries, the method comprising:
   a. receiving a packet from one of the nodes, the packet including an indication to modify the route table enable mask;
   b. producing an update mask;
   c. determining which logical operation to perform on the update mask and the route table enable mask in response to at least one of the received packet, the update mask, and the route table enable mask;
   d. generating a new route table enable mask by performing the appropriate logical operation on the update mask and the route table enable mask in response to the determination of which logical operation should be performed; and
   e. replacing the route table enable mask with the new route table enable mask.

7. The method according to claim 6 wherein the received packet includes the update mask and the update mask is produced by decoding the update mask from the packet.

8. The method according to claim 7 wherein determination of which logical operation to perform in step (c) is made in response to the update mask.

9. The method according to claim 8 wherein the route table enable mask comprises a plurality of bits and the method comprises determining to perform an AND of the update mask and the route table enable mask if one bit of update mask is a 0 and the other bits of the update mask are a 1, and determining to perform an OR of the update mask and the route table enable mask if one bit of update mask is a 1 and the other bits of the update mask are a 0.

10. The method according to claim 6 wherein the packet includes a source address and step (b) comprises generating the update mask in response to the source address and the route table enable mask.

11. The method according to claim 6 wherein the packet includes an operation code and step (c) comprises decoding the operation code to determine which logical operation to perform.

12. A router for routing packets among a plurality of nodes, the router comprising:
   a. an input port coupled to at least one of a plurality of nodes for receiving a packet from one of the nodes, the packet including a destination address;
   b. a plurality of output ports;
   c. memory for storing a route table having a plurality of route table entries identifying at least one of the plurality of output ports and a route table enable mask having a plurality of route table enable mask entries, each of the route table enable mask entries characterizing the enablement of one or more corresponding route table entries; and
   d. a processor for producing an update mask, determining which logical operation to perform on the update mask and the route table enable mask in response to at least one of the received packet, the update mask, and the route table enable mask, and for generating a new route table enable mask by performing an appropriate logical operation on the update mask and the route table enable mask in response to the determination of which logical operation to perform.

13. The router according to claim 12 comprising a plurality of input ports, each input port having a corresponding route table.

14. The router according to claim 13 comprising a route table enable mask corresponding to each route table.

15. A symmetric multiprocessor system comprising
   a. a plurality of cells having at least one processor; and
   b. a routing fabric having a crossbar for communicating a packet from one of the plurality of cells to another of the plurality of cells, the crossbar comprising:
      i. a plurality of input ports coupled to one of the plurality of cells for receiving a packet comprising an update mask from the cell,
      ii. a plurality of output ports coupled to one of the plurality of cells,
      iii. a storage device for storing a route table having a plurality of route table entries and a route table enable mask having a plurality of route table enable mask entries corresponding to the route table entries, and
      iv. a processor for generating a new route table enable mask by performing a logical operation on the update mask and the route table enable mask.

16. A symmetric multiprocessor system according to claim 15 wherein the crossbar comprises a distinct route table corresponding to each of its plurality of input ports.

17. A symmetric multiprocessor system according to claim 15 wherein the received packet includes an operation code and the processor decodes the operation code to determine which logical operation to perform on the update mask and the route table enable mask.

18. A symmetric multiprocessor system according to claim 17 wherein the packet received on the input port identifies a route table enable mask corresponding to another input port to be modified.

19. A symmetric multiprocessor system according to claim 15 wherein each crossbar includes a crossbar address, the received packet includes a destination address, and the processor identifies a received packet as a request to modify the route table enable mask in response to the destination address indicating the crossbar address.

20. A symmetric multiprocessor system according to claim 19 wherein the destination address identifies a route table enable mask to be modified.

21. The symmetric multiprocessor according to claim 15 wherein the received packet includes a source address and an indication to modify the route table enable mask and the processor validates the indication to modify the route table enable mask based on the source address of the received packet.

22. The symmetric multiprocessor according to claim 15 wherein at least one of the output ports of the crossbar is coupled to one of the plurality of cells via direct connection to the cell.

23. The symmetric multiprocessor according to claim 15 wherein at least one of the output ports of the crossbar is coupled to one of the plurality of cells via another crossbar coupled to the one of the plurality of cells.

24. A computer readable media comprising computer readable code for instructing a computer to modify routing of packets in a system where packets are routed among a plurality of nodes in accordance with a route table having a plurality of route table entries and a route table enable mask having a plurality of route table enable mask entries that characterize the enablement of route table entries, wherein the computer readable code comprises computer readable code for modifying the route table enable mask by executing steps comprising:
   a. receiving a packet from one of the nodes, the packet including an operation code and an update mask;
   b. reading the route table enable mask from a memory location;
   c. decoding the operation code to determine whether to perform an AND or an OR of the update mask and the route table enable mask;
   d. generating a new route table enable mask by performing a logical operation on the update mask and the route table enable mask in response to the decoded operation code; and
   e. storing the new route table enable mask in the memory location.

25. A fabric for communicating data among a plurality of cells in a symmetric multiprocessor system in accordance with a route table having a plurality of route table enable entries and a route table enable mask having a plurality of route table enable mask entries, the fabric comprising:
   first means for receiving a packet from one of the plurality of cells, the packet including an operation code and an update mask;
   second means for decoding the operation code to determine which logical operation to perform on the update mask and the route table enable mask;
   third means for generating a new route table enable mask by performing an appropriate logical operation on the update mask and the route table enable mask in response to the determination of which logical operation to perform; and
   fourth means for replacing the route table enable mask with the new route table enable ask.

* * * * *

UNITED STATES PATENT AND TRADEMARK OFFICE
CERTIFICATE OF CORRECTION

PATENT NO. : 7,349,982 B2 Page 1 of 1
APPLICATION NO. : 10/756433
DATED : March 25, 2008
INVENTOR(S) : David Paul Hannum et al.

It is certified that error appears in the above-identified patent and that said Letters Patent is hereby corrected as shown below:

In column 10, line 36, in Claim 25, delete "ask" and insert -- mask --, therefor.

Signed and Sealed this

Fifteenth Day of July, 2008

JON W. DUDAS
*Director of the United States Patent and Trademark Office*